US006574293B1

(12) United States Patent
Khayrallah et al.

(10) Patent No.: US 6,574,293 B1
(45) Date of Patent: Jun. 3, 2003

(54) RECEIVERS AND METHODS FOR REDUCING INTERFERENCE IN RADIO COMMUNICATIONS

(75) Inventors: Ali S. Khayrallah, Apex, NC (US); Gregory E. Bottomley, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/181,203

(22) Filed: Oct. 28, 1998

(51) Int. Cl.[7] ................................................ H04B 7/00
(52) U.S. Cl. ....................................... 375/347; 375/229
(58) Field of Search ......................... 375/229.267, 234, 375/346, 347, 348, 349; 455/132, 133, 149, 225, 346, 63, 67.3, 137

(56) References Cited

U.S. PATENT DOCUMENTS

| 5,193,102 A | * | 3/1993 | Meidan et al. | 375/132 |
|---|---|---|---|---|
| 5,202,990 A | * | 4/1993 | Saikawa | 375/347 |
| 5,319,677 A | * | 6/1994 | Kim | 375/341 |
| 5,455,844 A | * | 10/1995 | Ishikawa et al. | 375/232 |
| 5,499,272 A |   | 3/1996 | Bottomley | 375/347 |
| 5,502,506 A | * | 3/1996 | Choi | 348/607 |
| 5,530,725 A | * | 6/1996 | Koch | 375/347 |
| 5,546,429 A | * | 8/1996 | Chiasson et al. | 375/341 |
| 5,727,032 A | * | 3/1998 | Jamal et al. | 375/232 |
| 5,838,742 A | * | 11/1998 | Abu-Dayya | 375/347 |
| 5,844,951 A | * | 12/1998 | Proakis et al. | 375/347 |
| 5,884,192 A | * | 3/1999 | Karlsson et al. | 375/229 |
| 5,901,174 A | * | 5/1999 | Richard | 375/229 |
| 5,930,248 A | * | 7/1999 | Langlet et al. | 370/347 |
| 6,012,161 A | * | 1/2000 | Ariyavisitakul et al. | 375/233 |
| 6,058,138 A | * | 5/2000 | Fukumasa et al. | 375/208 |
| 6,088,389 A | * | 7/2000 | Larsson | 375/231 |
| 6,175,588 B1 | * | 1/2001 | Visotsky et al. | 375/148 |
| 6,178,194 B1 | * | 1/2001 | Vasic | 375/136 |
| 6,185,258 B1 | * | 2/2001 | Alamouti et al. | 375/260 |
| 6,192,038 B1 | * | 2/2001 | Wallerius et al. | 370/328 |
| 6,298,073 B1 | * | 10/2001 | LeFever | 370/503 |
| 6,301,316 B1 | * | 10/2001 | Uchida et al. | 375/347 |
| 6,487,255 B1 | * | 11/2002 | Arslan et al. | 375/262 |

FOREIGN PATENT DOCUMENTS

| EP | 0716513 A1 | 6/1996 |
|---|---|---|
| EP | 0833455 A2 | 4/1998 |
| JP | 63171028 | 7/1988 |
| WO | WO 95/34997 | 12/1995 |
| WO | WO 97/26712 | 7/1997 |
| WO | WO 98/16021 | 4/1998 |
| WO | WO 98/32243 | 7/1998 |

OTHER PUBLICATIONS

International Search Report, dated Jul. 24, 2000.

* cited by examiner

Primary Examiner—Bayard Emmanuel
(74) Attorney, Agent, or Firm—Myers Bigel Sibley & Sajovec

(57) ABSTRACT

A method for reducing interference combines soft symbols using existing processing devices. In particular, transmitted data signals are received over a plurality of paths. The received data signal includes an interference component. The received data signals are processed to provide a plurality of soft symbols that correspond to the transmitted data signal. The plurality of soft symbols are combined to reduce the interference component of the data signal and provided output signal that corresponds to the transmitted data signal. Accordingly, existing equalizers and combiners may be used to reduce interference. Related mobile user terminal and receivers are disclosed.

50 Claims, 8 Drawing Sheets

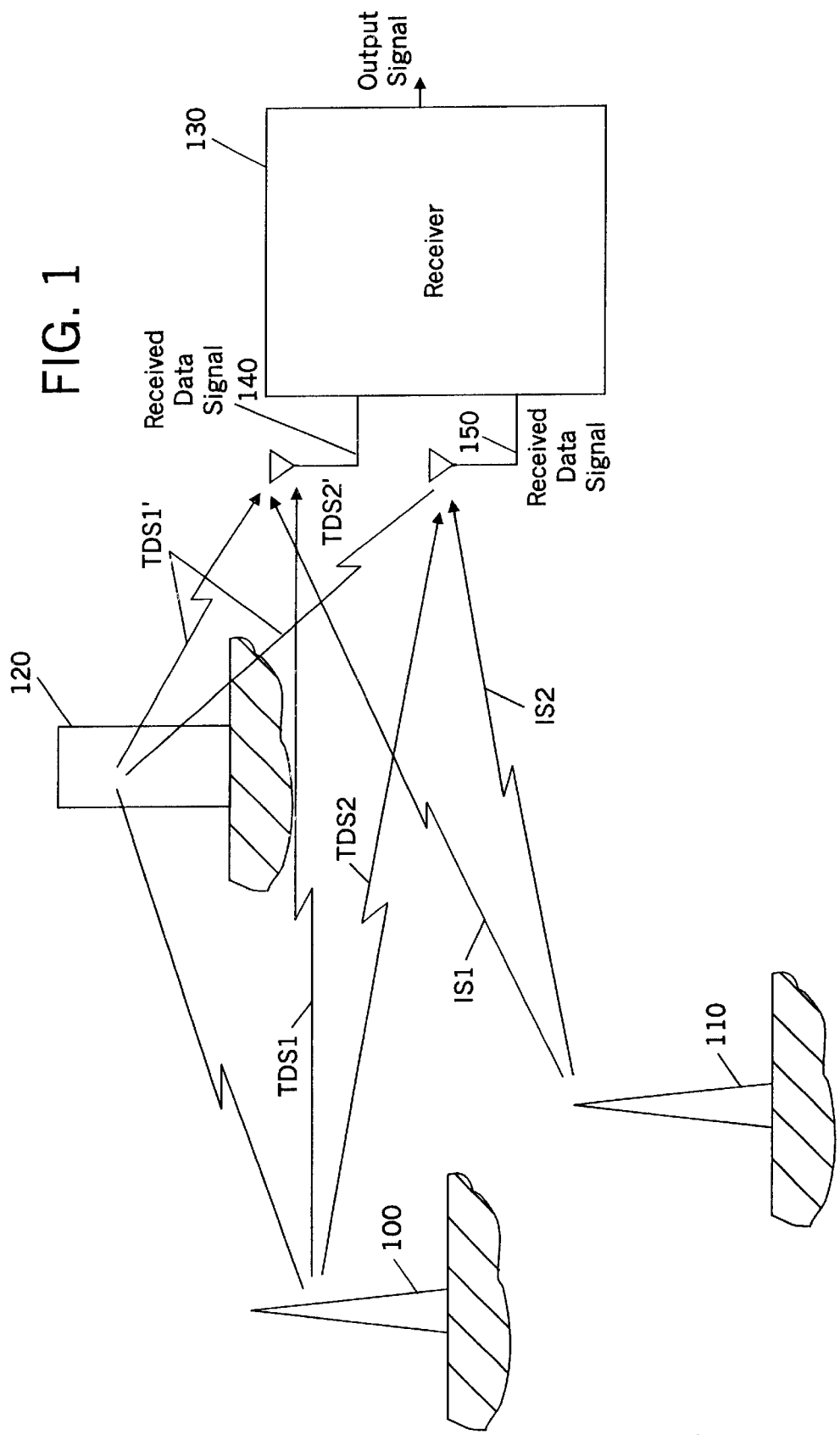

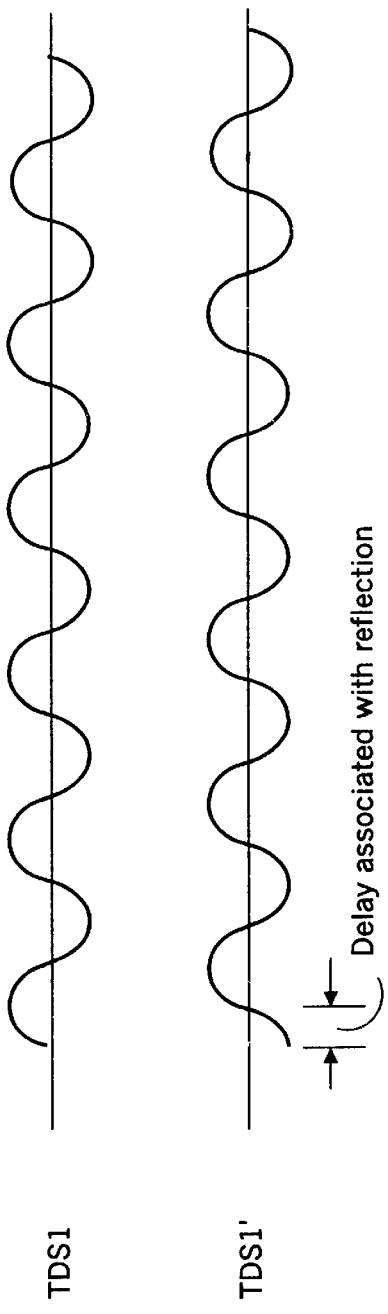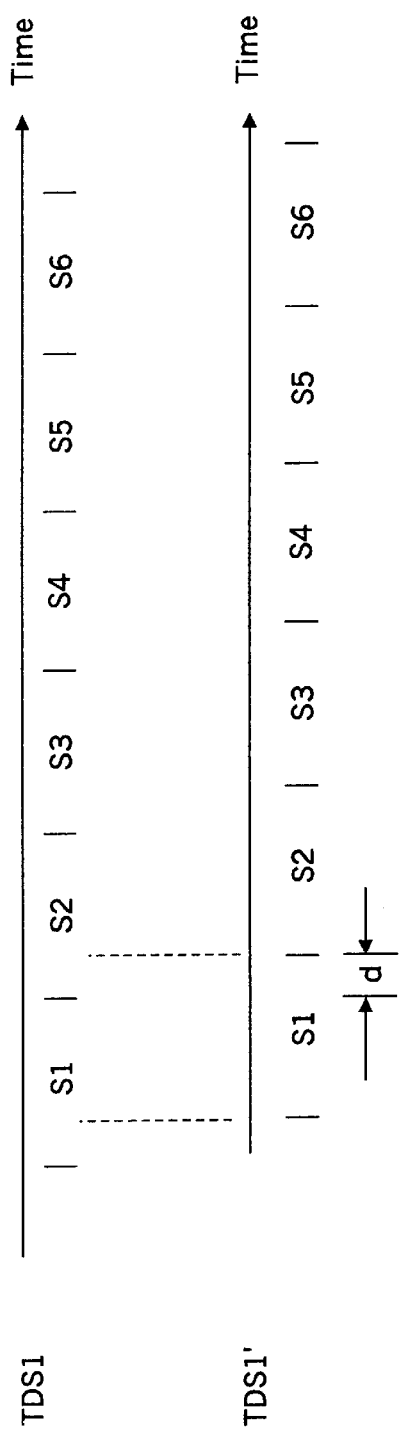

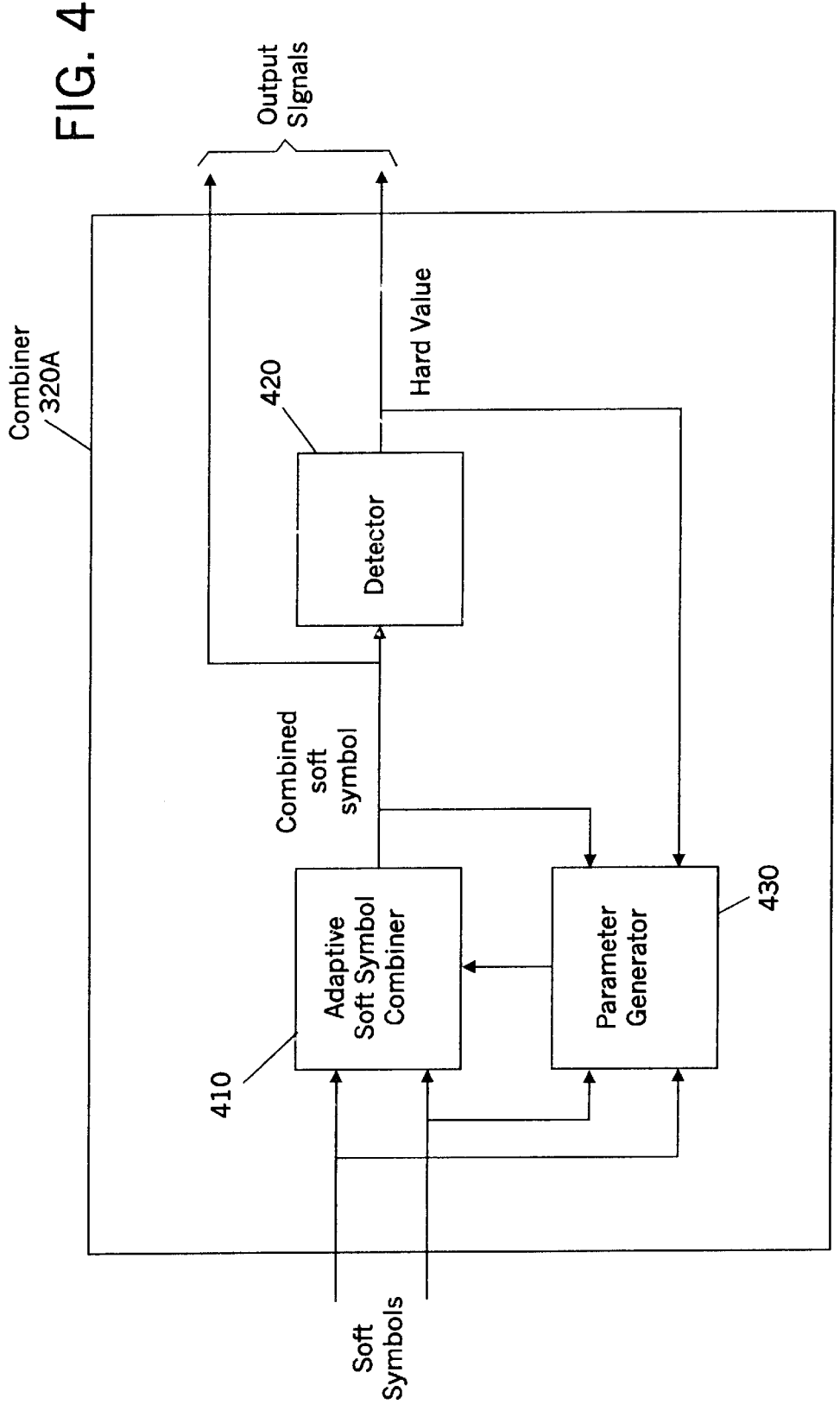

RECEIVERS AND METHODS FOR REDUCING INTERFERENCE IN RADIO COMMUNICATIONS

Notwithstanding the IRC techniques discussed above, there continues to exist a need in the art for improved interference reduction receivers, methods, and related terminals and accessories.

SUMMARY OF THE INVENTION

It is, therefore, an object of the present invention to provide improved radio communications methods and receivers.

It is another object of the present invention to reduce interference after demodulation in radio communications methods and receivers.

The present invention provides receivers and methods that allow a reduction in interference by combining soft symbols. In particular, transmitted data signals are received over a plurality of paths and the received data signals may include interference components. The received data signals are processed to provide a plurality of soft symbols that correspond to the transmitted data signal. The plurality of soft symbols are combined to reduce the interference component of the received data signal and provide an output signal that corresponds to the transmitted data signal. Accordingly, equalizers that provide soft symbols may be used with combiners to reduce interference, thereby reducing the need to create custom devices to reduce interference. In contrast, conventional systems may be custom-designed to process the received data signal to reduce interference and may thereby increase the cost of the system.

Each equalizer may reduce the interference of at least two interfering portions of the received data signal. Each equalizer may be a coherent detector that reduces interference of at least two interfering portions of the received data signal by estimating channel coefficients and applying the estimated channel coefficients to the at least two interfering portions of the received data signal. Accordingly, equalizers may be used to provide soft symbols for each of the respective received data signals to allow a reduction in the cost of the system.

The combiner combines the plurality of soft symbols based on estimated parameters to provide a combined soft symbol and the combined soft symbol is detected to provide a hard value. The combined soft symbol may be used to generate the estimated parameters. According to the present invention, combiners may be used in conjunction with the equalizers described herein to reduce interference.

In particular, the combiner can include an adaptive combiner that generates weighted soft symbols based on a plurality of soft symbols and sums the weighted soft symbols to provide a combined soft symbol. In addition, a detector can detect the combined soft symbol to provide a hard value, wherein the hard value is an estimated value of the transmitted data signal based on the combined soft symbol. A comparator can compare the hard value to the combined soft symbol to provide the error signal that indicates the difference between the combined soft symbol and hard value.

In another aspect of the present invention, the transmitted data signal can be a predetermined synchronization signal, wherein the predetermined synchronization signal corresponds to a known combined soft symbol, and the combiner can modify the estimated parameters based on the known combined soft symbol. The present invention, therefore, allows for the reduction of interference without requiring an error signal as described above.

In another aspect of the present invention, a receiver such as a mobile user terminal may be combined with an accessory that includes an external antenna. The external antenna provides a received data signal to the mobile user terminal. The addition of the external antenna may therefore be used to reduce interference. The mobile user terminal includes a housing wherein the equalizers and the combiner are located within the housing. An antenna is attached to the housing and coupled to a first one of the equalizers located in the housing. A port located on the housing is coupled to a second one of the equalizers. The port provides a detachable coupling between the second equalizer and the external antenna.

Alternately, the accessory may include an equalizer that receives a received data signal from the external antenna. In particular, the external antenna is separate from the mobile user terminal and receives the received data signal corresponding to the transmitted data signal from the remote source including an interference component. The accessory equalizer is separate from the mobile user terminal and processes the received data signal from the external antenna to provide an accessory soft symbol. The accessory soft symbol is provided to the mobile user terminal via an accessory connector. The accessory connector connects to the port on the mobile user terminal wherein the accessory soft symbol is provided to the combiner in the mobile user terminal.

In still another aspect of the present invention, the received data signal may be converted to a digital signal. In particular the received data signal can be converted to baseband digital samples and processed to provide the plurality of soft symbols.

BRIEF DESCRIPTION OF THE FIGURES

FIG. 1 illustrates radio communications systems according to the present invention;

FIG. 2A illustrates inter-symbol interference between different portions of a transmitted data signal;

FIG. 2B illustrates time intervals for sampling transmitted data signals;

FIG. 4 is block diagram of a first combiner according to the present invention;

DETAILED DESCRIPTION OF THE INVENTION

Figure 3:
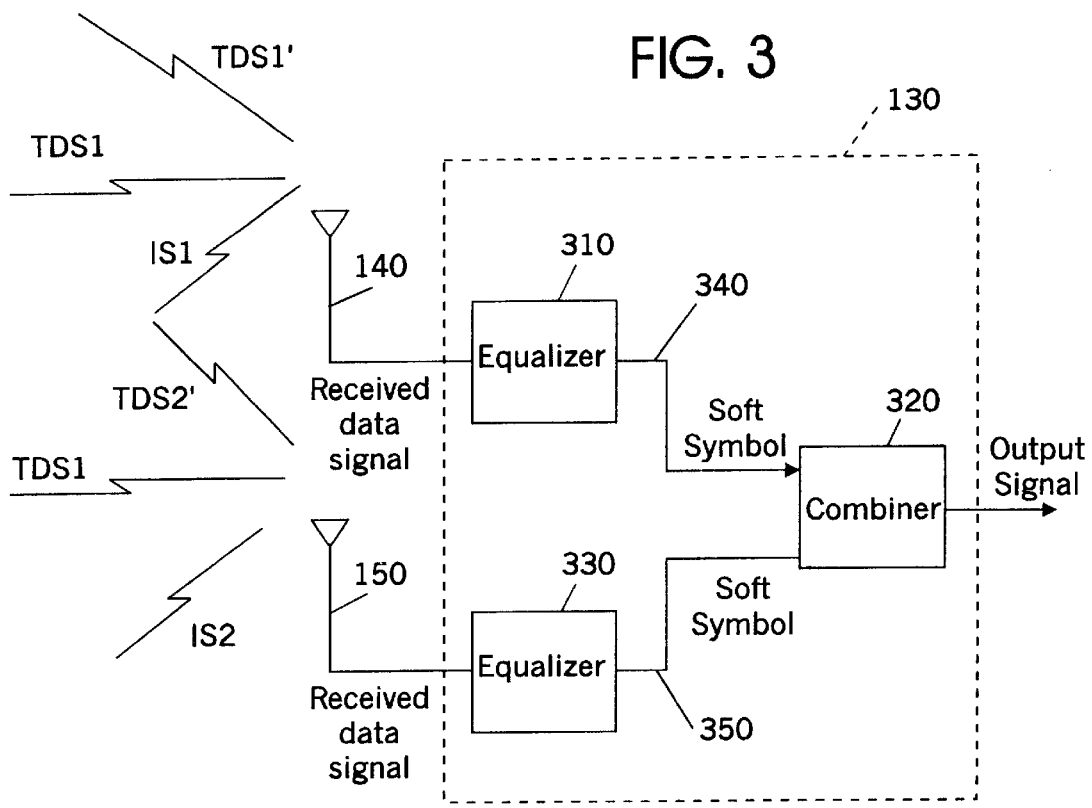
FIG. 3 is a block diagram of a receiver according to the present invention.

The present invention now will be described more fully hereinafter with reference to the accompanying drawings, in which preferred embodiments of the invention are shown.

This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

FIG. 1 illustrates a radio communications system according to the present invention. According to FIG. 1, a transmitter 100 transmits a data signal TDS1, TDS2 to a remotely located receiver 130. The transmitted data signal TDS1, TDS2 is received by the receiver 130 via antennas 140 and 150 over a plurality of paths to provide a plurality of received data signals. An interference source 110, inside or outside the communications system, may generate interference IS1, IS2 such that the received data signals include an interference component upon their reception at the receiver 130. For example, the interference source 110 may be an adjacent transmitter in a cellular system that shares channels with the transmitter 100, thereby inducing interference components into the received data signals.

Similarly, a reflective interference source 120 may reflect the transmitted data signal from the transmitter 100 to produce reflections TDS1', TDS2' such that the received data signals include respective reflected data components at the receiver 130 and thus multi-path interference. The receiver 130 processes each of the received data signals including reflections and interference, to reduce the multi-path interference in the received data signal, producing a respective soft symbol for each of the received data signals. The receiver 130 combines each of the soft symbols to produce the output signal having a reduced interference component such that the output signal corresponds to the transmitted data signal. In other words, the combination of the soft symbols can reduce interference due to the interference source 110.

The antennas described herein are configured to provide diverse reception of the transmitted data signals. It will be understood that the term diversity as used herein includes spatial diversity and polarization diversity. In addition, the antennas may be a phased array.

The soft symbol is a representation of the received data signal that includes data and associated information that indicates a level of confidence in the data. For example, the soft symbol can represent the received data signal with a +1 of −1 and an associated confidence level that indicates the likelihood that the received data signal is actually equal to the +1 or −1.

FIG. 2A illustrates inter-symbol interference resulting form the reception of the transmitted data signal over multiple paths as illustrated in FIG. 1. According to FIG. 2, the transmitted data signals TDS1 is received at the receiver having a particular phase. The transmitted data signal TDS1' is delayed with respect to the transmitted data signal TDS1 at the receiver, such as due to a reflection off a building 120 as shown in FIG. 1. The delay at the receiver is due to the longer path that the transmitted data signal TDS1' follows. For example, the transmitted data signal TDS1' may be created as a result of a reflection off interference source 120. The interference signal then travels to the receiver. Therefore, the path traveled by the reflected transmitted data signal TDS1' is longer than the path followed by the transmitted data signal TDSI to the receiver. Accordingly, the reflected data signal TDS1' arrives at the receiver after the transmitted data signal TDS1 and has a phase shift with respect to the transmitted data signal at the receiver.

FIG. 2B illustrates the time intervals for sampling the transmitted data signals. In particular, the time intervals for sampling S1, S2, S3, S4, S5, and S6 coincide with the period of the transmitted data signals TDS1 at the receiver. As shown in FIG. 2B, the incidence of the reflected signal TDS1' from the reflective source 120 is shifted with respect to the incidence of the transmitted data signal TDS1. For example the incidence of the reflected data signal TDS1' at the receiver overlaps the time intervals S1 and S2. Consequently, the reflected data signal TDS1' can cause multi-path interference at the time when received samples corresponding to S1 and S2 are generated.

FIG. 3 is a block diagram of a receiver according to the present invention. In particular, the interference signals IS1 and IS2 and the transmitted data signals TDS1, TDS1', TDS2 and TDS2' are received by antennas 150, 140. To simplify the description, no reflections of IS1 and IS2 are considered herein. The inclusion of reflections of IS1 and IS2 is, however, within the scope of the present invention.

The antenna 140 receives the interference signals and the transmitted data signals to provide received data signals to the equalizer 310. The received data signals provided by antenna 140 include the transmitted data signals and interference components. The equalizer 310 processes the received data signal to provide a respective soft symbol 340 to a combiner 320. Similarly, the antenna 150 receives transmitted data signals and interference to provide a received data signal to the equalizer 330. The received data signals provided by the antenna 150 include the transmitted data signal and interference components. The equalizer 330 processes the received data signals to provide a respective soft symbol 350 to the combiner 320.

The combiner 320 combines the soft symbols 340, 350 from the respective equalizer to provide an output signal that corresponds to the transmitted data signal. Applying traditional post-detection concepts, the combiner could use a technique such as maximal ratio combining wherein soft values are weighted by the signal amplitude divided by the noise power before being added together. Equal gain combining results when the weights are equal. Selection diversity occurs when only one of the soft values is selected. When the soft symbols are properly formed (such as when using pre-weighted maximal ratio combining) the soft symbols are added by the combiner. According to these approaches, however, the interference power may be unchanged or increased.

According to the present invention, combining may cause the interference to add destructively, thereby reducing the interference.

The equalizers 310, 330 may be any equalizer that compensates for the intersymbol interference (ISI) due to multipath effects described above. More particularly, the equalizers 310, 330 may be linear equalizers, decision feedback equalizers (DFEs), maximum likelihood sequence estimators (MLSEs), or maximum a posteriori (MAP) equalizers. When IS1 is not significant, the equalizers 310, 330 may compensate for the phase and amplitude effects of the radio channel. Such coherent detectors estimate a phase reference or channel coefficients and apply these estimates to the received data signal.

FIG. 4 is a block diagram illustrating a first combiner according to the present invention. The combiner 320A includes an adaptive soft symbol combiner 410 that combines soft symbols based on estimated parameters to provide a combined soft symbol. The combined soft symbol is provided to a detector 420 that produces a hard value. The hard value is an estimate of the transmitted data signal based on the combined soft symbol, for example a +1 or −1. A parameter generator 430 estimates parameters based on the individual soft symbols and the combined soft symbol. The parameter generator 430 estimates an equivalent channel and impairment correlation for the soft symbol. The hard value can also be used in the generation of the estimated parameters. The output signal may be the hard value or the combined soft symbol. The hard or combined soft value may be further processed by a decoder to produce speech output.

Figure 5:
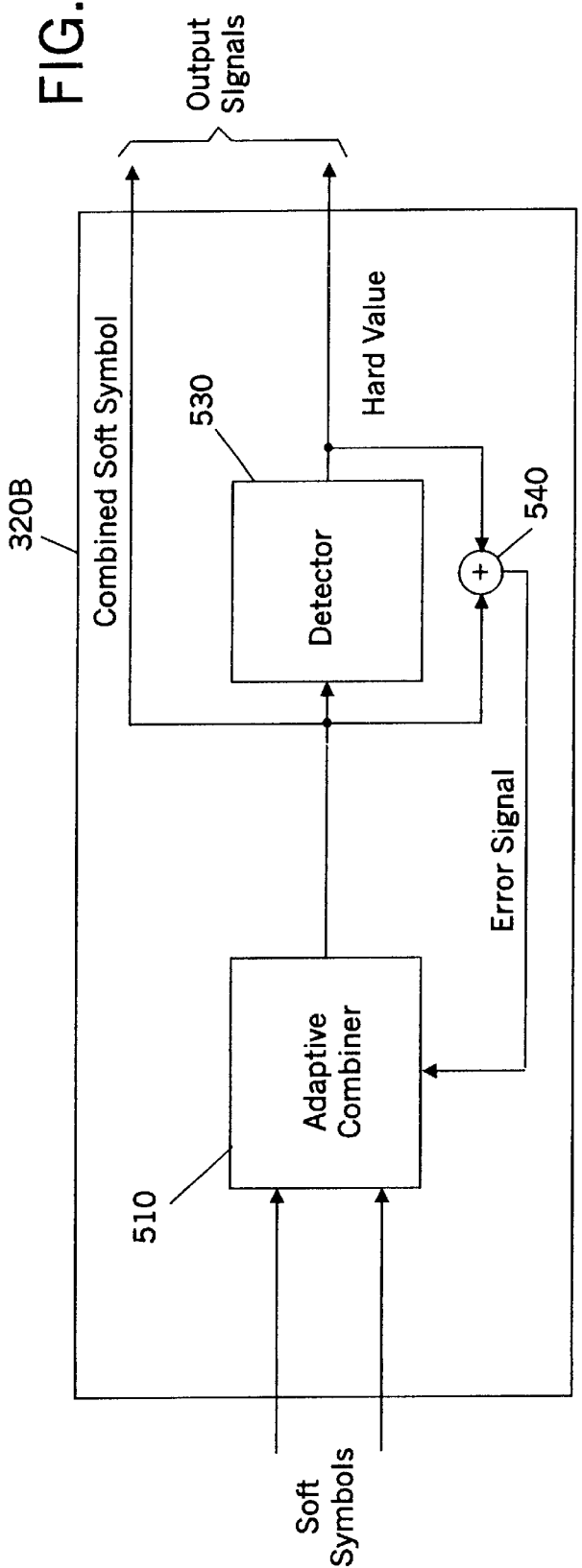
FIG. 5 is a block diagram of a second combiner according to the present invention.

FIG. 5 is a block diagram illustrating a second combiner according to the present invention. The combiner 320B includes an adaptive combiner 510 that generates a combined soft value that is a weighted sum of soft symbols based on the soft symbols and an error signal. The weighting of the soft symbols may be provided using techniques selected from those known the art. For example, the weights may be adapted using techniques such as LMS or RLS. The combined soft symbol is provided to a detector 530 that detects the combined soft symbol to provide a hard value. The hard value is an estimate of the transmitted data signal based on the combined soft symbol. The hard value and the combined soft symbol are provided to a comparator 540. The comparator 540 compares the hard value to the combined soft symbol to provide the error signal that indicates the difference between the combined soft symbol and the hard value. As described above, the error signal is used by the adaptive combiner 510 to generate the weighted soft symbols. The output signal may be the combined soft symbol or the hard value.

In another embodiment, neither the combined soft symbol nor the hard value is used to generate the error signal. Rather, a predetermined synchronization signal is transmitted by the transmitter, and a known combined soft symbol, that corresponds to the pre-determined synchronization signal, is provided to the adaptive combiner 510. The operation of the receiver may thereby be tested using the predetermined synchronization signal and the corresponding known combined soft symbol. The weights given to the soft symbols by the adaptive combiner 510 can thus be adjusted based on a difference between the combined soft symbol generated in response to the synchronization signal and the known combined soft symbol.

Figure 6:
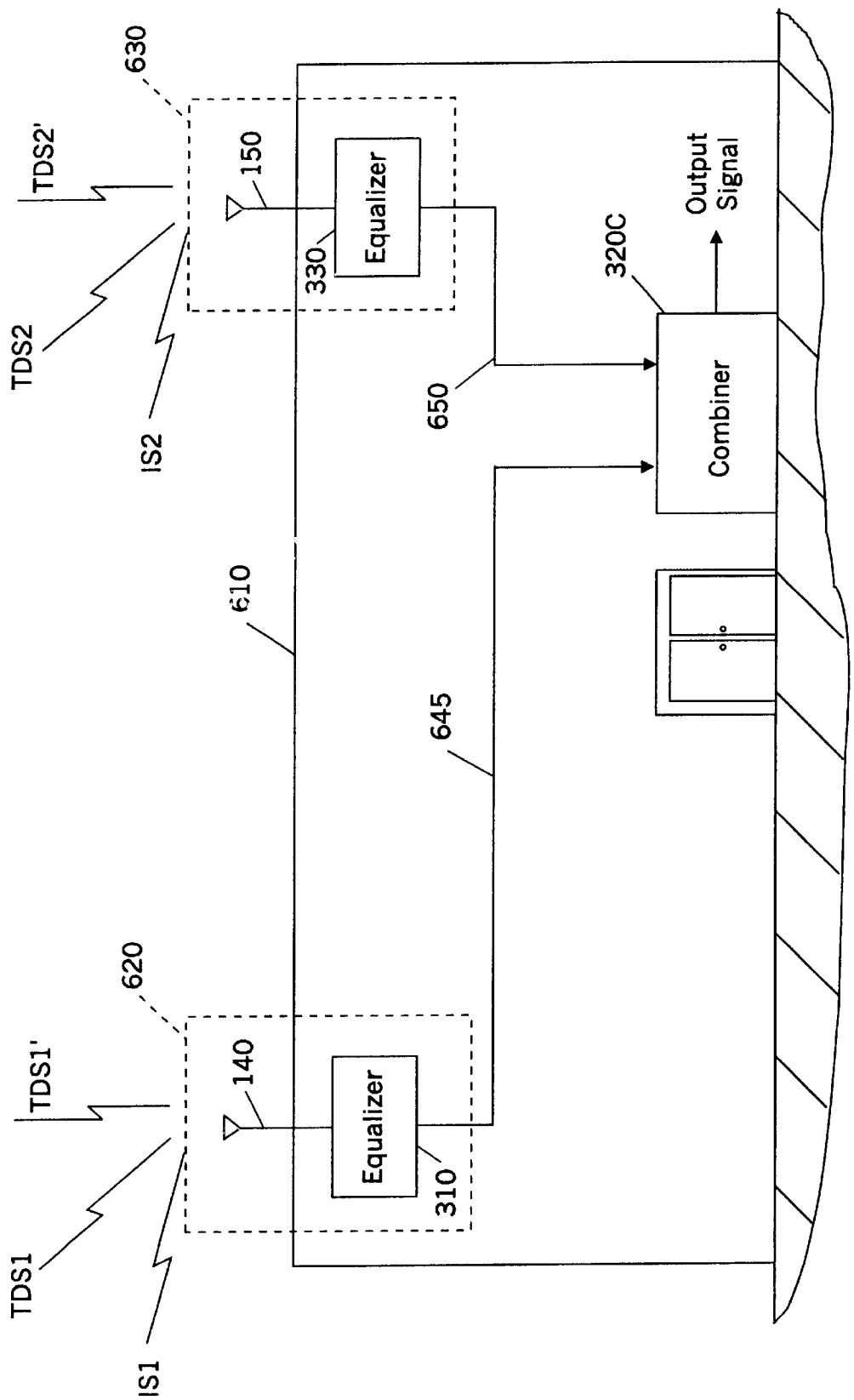
FIG. 6 is a block diagram of radio communications systems including spaced apart radio heads according to the present invention.

FIG. 6 is a block diagram of radio communication systems including radio heads according to the present invention. In particular, the radio head 620 including antenna 140 and equalizer 310 is spaced apart from a combiner 640. The antenna 140 receives the transmitted data signals and the interference signals TDS1, TDS2, IS1, IS2, TDS1', TDS2' and provides a received data signal to the equalizer 310. The equalizer 310 processes the received data signal to reduce inter-symbol interference to provide soft symbols to the combiner 320C over a cable 645. Similarly, a radio head 630 includes antenna 150 responsive to equalizer 330. The radio head 630 is also spaced apart from the combiner 320C and the radio head 620. The antenna 150 receives the transmitted data signals and the interference signals to provide received data signals to the equalizer 330. The equalizer 330 processes the received data signals to reduce the inter-symbol interference. The equalizer 330 provides soft symbols to the combiner 320C over a cable 650. The combiner 320C combines the soft symbols provided by the radio heads 620, 630 to provide an output signal as discussed above with reference to FIGS. 3, 4 and 5. The radio heads 620, 630 may also be spaced apart from each other.

Locating the antenna and the respective equalizer in each respective radio head may allow the respective cable to be less expensive than in other implementations. For example, the soft symbol provided by the respective equalizer may include less data than the received data signal provided by the respective antenna. Accordingly, the amount of data transmitted over the cable may be reduced. In contrast, locating the respective equalizer apart from the respective antenna may require that more data be transmitted over a respective cable. Consequently, the respective cable may need to be of higher cost and quality to sustain the higher data rate.

Figure 7:
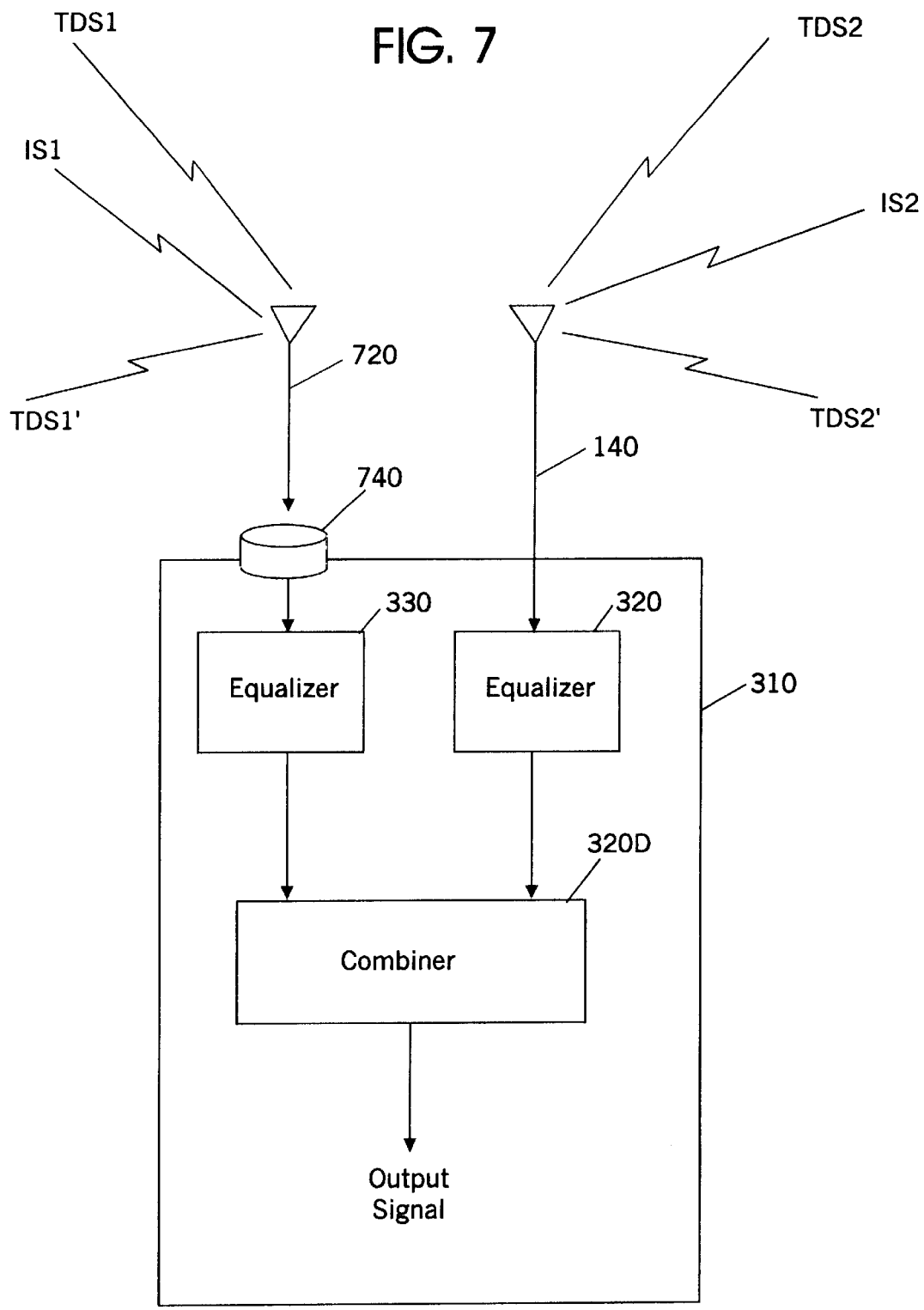
FIG. 7 is a block diagram of a receiver including a port for an external antennas according to present invention.

FIG. 7 is a block diagram of a receiver and an external antenna according to the present invention. In particular, antenna 140, located within or on a housing 710, receives transmitted data signals and interference signals TDS2, IS2, TDS2' and provides a received data signal to the equalizer 310. The equalizer 310, located in the housing 710, processes the received data signal to reduce inter-symbol interference caused by multi-path interference to provide soft symbols to the combiner 320D located in the housing 710. An external antenna 720 can be connected to the equalizer 330 through a port 740 located on housing 710 that provides a removable connection between the external antenna 720 and equalizer 330. The external antenna 720, located outside the housing 710, receives the transmitted data signals and the interference signals TDS1, IS1, TDS1' to provide second received data signals to the second equalizer 330. The equalizer 330 processes the received data signals from the external antenna 720 to reduce inter-symbol interference caused by the interference signal to provide a soft symbol to the combiner 320D. The combiner 320D combines the soft symbols provided by the equalizer 330 and the equalizer 310 to provide the output signal as discussed above with reference to FIGS. 3–5.

Figure 8:
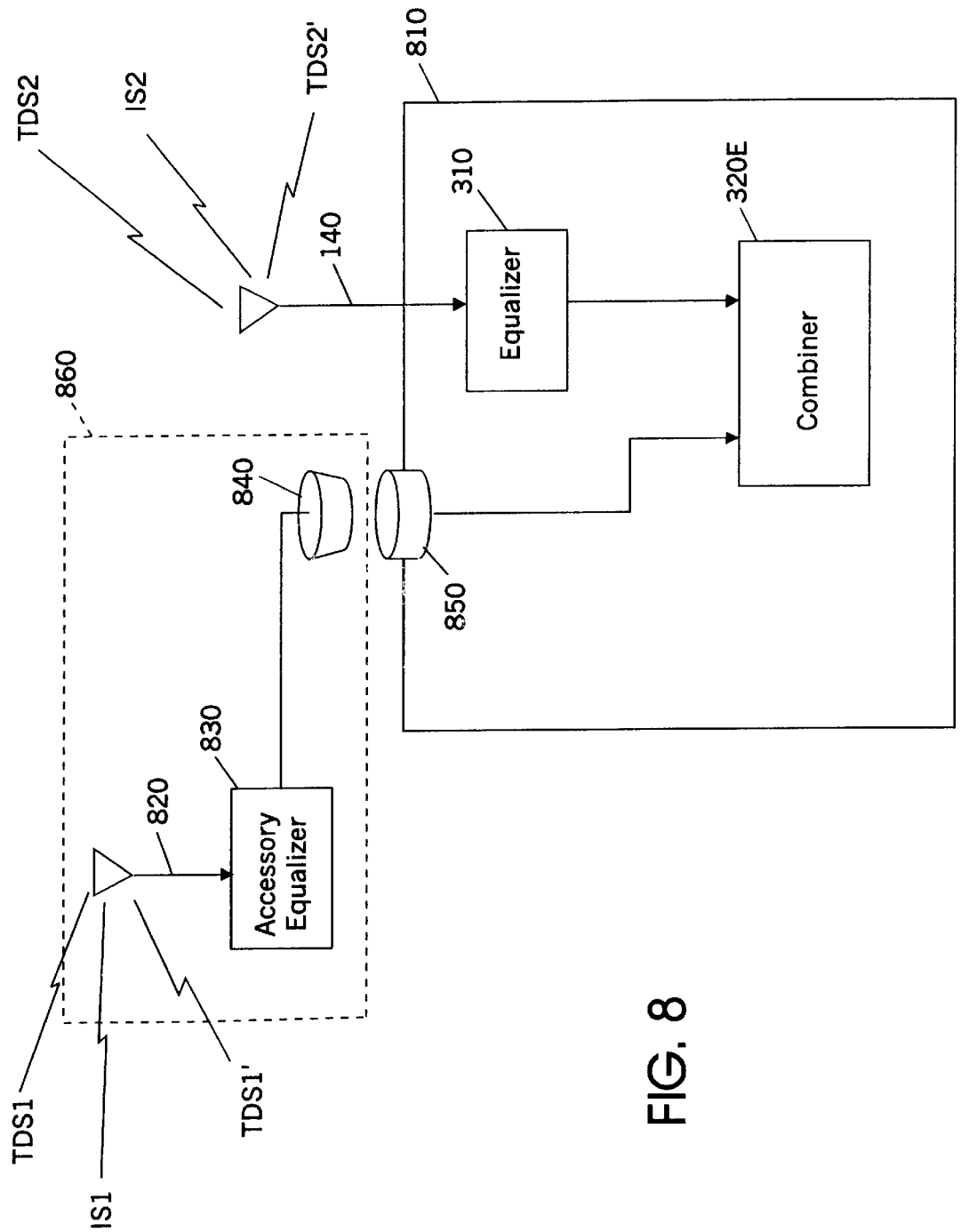
FIG. 8 is a block diagram of a mobile user terminal and a related accessory according to the present invention.

FIG. 8 is a block diagram of a mobile user terminal and an accessory according to the present invention. In particular, the antenna 140 receives the transmitted data signals and interference signals TDS2, IS2, TDS2', to provide received data signals. A mobile user terminal 810 includes an equalizer 310 that receives the received data signals from the antenna 140. The equalizer 310 processes the received data signals to reduce the inter-symbol interference caused by the multi-path interference and provides a soft symbol to the combiner 320E.

An accessory 860 includes an accessory antenna 820 that receives transmitted data signals and interference signals TDS1, IS1, TDS1' to provide a received data signal to an accessory equalizer 830 included in the accessory 860.

The accessory equalizer 830 processes the received data signals to reduce the inter-symbol interference caused by multi-path interference and provides an accessory soft symbol to accessory connector 840. The accessory connector 840 removably connects to a port 850 located on the mobile user terminal 810 and the port 850 is coupled to the combiner 320E. The accessory soft symbol may thereby be provided to the combiner 320E via the connection of accessory connector 840 to the port 850, and the combiner 320E combines the soft symbol from the equalizer 310 with the accessory soft symbol provided by the accessory equalizer 330 to provide the output signal as discussed above with referenced to FIGS. 3–5.

Figure 9:
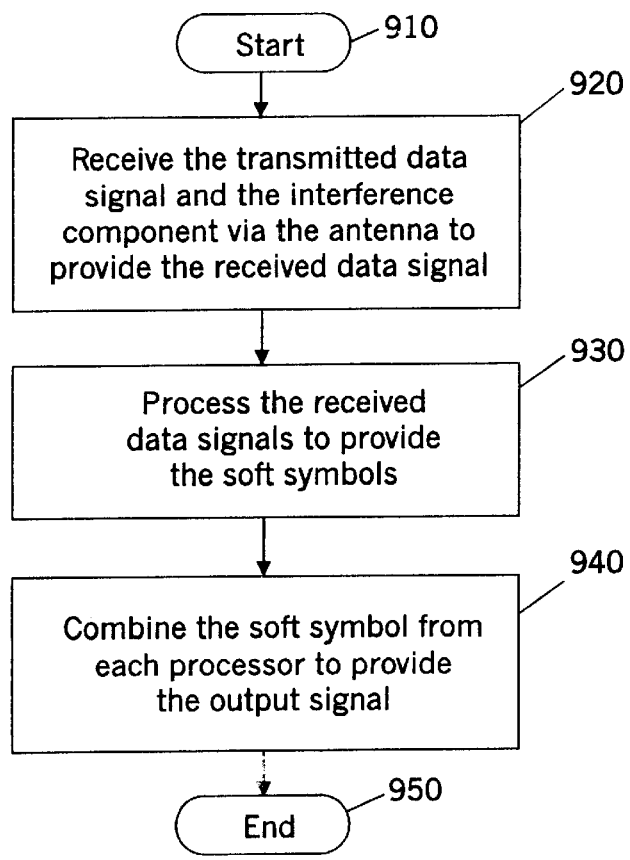
FIG. 9 is a flowchart illustrating operations of receivers according to the present invention.

FIG. 9 is a flow chart illustrating operations of receivers using post detection IRC with an equalizer for a binary modulation according to the present invention. A GMSK modulation scheme used in GSM can be modeled as a binary modulation with inter-symbol interference. In the following example, the inter-symbol interference is ignored. The equalizer is a maximum likelihood sequence estimator (MLSE) operating on symbol spaced samples. The MLSE is a trellis structure of the type shown in FIG. 10 and uses a Viterbi algorithm to efficiently search the trellis for the best symbol sequence.

Processing begins at step 910. The transmitted data signals and interference signals are received via a plurality of antennas to provide a respective plurality of received data signals (block 920). Accordingly, the end received data signal may be expressed as:

$$r(k) = c_0 s(k) + c_1 s(k-1) + d_0 i(k) \quad (1)$$

where $c_0 s(k)$ is the transmitted data signal, $c_1 s(k-1)$ is the reflection of the transmitted data signal, and where $d_0 i(k)$ is the interference component. The terms $c_0$, $c_1$, and $d_0$ are the channel coefficients for the respective component and are assumed to be known and constant over a GSM burst. In operation, however, the channel coefficients may be estimated using the predetermined synchronization signals as described above. In the above equation additive type noise is ignored.

A transition on the equalizer at stage k is identified with the symbol +1 or −1. The beginning state is termed $s(k-1)$ and the ending state is termed as $s(k)$. The received value $r(k)$ is compared to the synthesized value:

$$c_0 s(k) + c_1 s(k-1)$$

Figure 10:
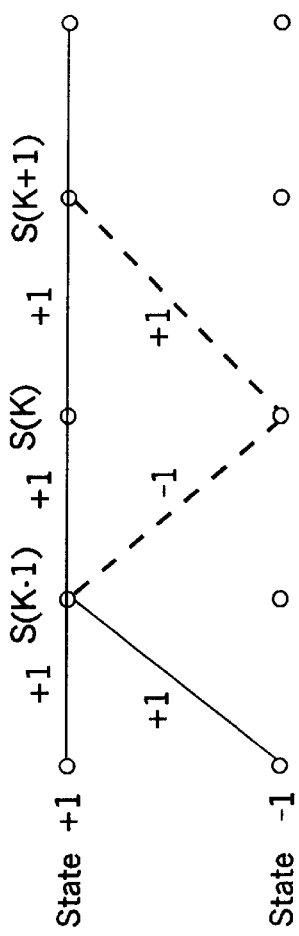
FIG. 10 is a trellis structure representing a maximum likelihood sequence estimator.

In addition to a hard value corresponding to the kth bit, the equalizer produces a soft symbol associated with the kth bit. In this example, the method of metric difference for an error event of length 2, illustrated FIG. 10, is used. It will be understood that there are others method of producing soft symbols.

The received data signal, $r(k)$, is processed to reduce the inter-symbol interference to provide the soft symbol (block 930). The soft symbol for the kth bit may be expressed as:

$$\hat{s}(k) = -|r(k+1) - c_0(+1) - c_1(+1)|^2 - \quad (2)$$
$$|r(k) - c_1(+1) - c_0(+1)|^2 +$$
$$|r(k+1) - c_0(+1) - c_1(-1)|^2 +$$
$$|r(k) - c_1(+1) - c_0(-1)|^2$$

Equation 2 may be rewritten as:

$$\hat{s}(k) = 4Re(c_1^* r(k+1)) + 4Re(c_0^* r(k)) - 8Re(c_0^* c_1)) \quad (3)$$

Substituting equation 1 into equation 3 produces:

$$\hat{s}(k) = 4(|c_0|^2 + |c_1|^2)s(k) + \quad (4)$$
$$4Re(c_0^* c_0)s(k+1) + 4Re(c_0^* c_1)s(k-1) +$$
$$4Re(c_1^* d_0)i(k+1) + 4Re(c_0^* d_0)i(k) -$$
$$8Re(c_0^* c_1)$$

where $s(k)$ is assumed to be equal to +1 or −1. Equation 4 may be rewritten as:

$$\hat{s}(k) = \alpha s(k) + \beta s(k+1) + \gamma s(k-1) + \delta i(k+1) + \varepsilon i(k) + \phi \quad (5)$$

where $\alpha = 4(|c_0|^2 + |c_1|^2)$ and $\beta = 4Re(c_0^* c_1)$.

The output of each equalizer given by equation five is combined to provide the output signal (block 940). In particular for antennas 1 and 2, the equation for each respective soft symbol given by equation 5 can be expressed as:

$$\hat{s}_1(k) = \alpha_1 s(k) + \beta_1 s(k+1) + \gamma_1 s(k-1) + \delta_1 i(k+1) + \varepsilon_1 i(k) + \phi_1 \quad (6)$$
$$\hat{s}_2(k) = \alpha_2 s(k) + \beta_2 s(k+1) + \gamma_2 s(k-1) + \delta_2 i(k+1) + \varepsilon_2 i(k) + \phi_2$$

To cancel interference term $i(k)$, the antennas would be combined with weights determined by parameter estimates. The equivalent channel estimates would be $c = [(\alpha_1 \alpha_2)]^T$ for the two antennas. The equivalent impairment correlation associated with $i(k)$ would be $$R = \begin{bmatrix} \varepsilon_1^2 & \varepsilon_1 \varepsilon_2 \\ \varepsilon_1 \varepsilon_2 & \varepsilon_2^2 \end{bmatrix}$$

The combining weights are the adjoint of R times C, i.e., $$adj(R)c = \begin{bmatrix} \varepsilon_2^2 & -\varepsilon_1 \varepsilon_2 \\ -\varepsilon_1 \varepsilon_2 & \varepsilon_1^2 \end{bmatrix} \begin{bmatrix} \alpha_1 \\ \alpha_2 \end{bmatrix} = \begin{bmatrix} W_1 \\ W_2 \end{bmatrix} = \begin{bmatrix} \varepsilon_2^2 \alpha_1 - \varepsilon_1 \varepsilon_2 \alpha_2 \\ \varepsilon_1^2 \alpha_2 - \varepsilon_1 \varepsilon_2 \alpha_1 \end{bmatrix}$$

Note that the adjoint is used instead of the inverse when the determinant of R is zero.

Combining the equation for the respective soft symbol from each processor yields:

$$\hat{s}_c(k) = (\alpha_1 \varepsilon_2^2 - \alpha_2 \varepsilon_1 \varepsilon_2) \hat{s}_1(k) + (-\alpha_1 \varepsilon_1 \varepsilon_2 + \alpha_2 \varepsilon_1^2) \hat{s}_2(k) \quad (7)$$
$$= (\varepsilon_1 \alpha_2 - \varepsilon_2 \alpha_1)^2 s(k) + \ldots + (0)i(k) + \ldots$$

which indicates that the interference component $i(k)$ is canceled while the transmitted data signal is preserved. An exception exists, however, when:

$$\varepsilon_1 \alpha_2 - \varepsilon_2 \alpha_1 = 0$$

In this case, the transmitted data signal and the interference signals reach the antenna array from the same direction or virtual direction. This situation happens rarely and as such the reduction in interference may be achieved otherwise. Processing stops at block 950.

The present invention may be embodied in receivers and methods wherein the data signal is converted to baseband digital samples. The baseband digital samples may be processed to provide the soft symbols.

Many modifications and other embodiments of the invention will come to the mind of one skilled in the art having the benefit of the teachings presented in the foregoing descriptions and the associated drawings. Therefore, it is to be understood that the invention is not limited to the specific embodiments disclosed, and that modifications and embodiments are intended to be included within the scope of the appended claims.

What is claimed is:

1. A method for reducing an interference component of a data signal corresponding to a transmitted data signal from a remote source, the method comprising:
   receiving the data signal including the interference component over a plurality of paths to provide a plurality of received data signals each including a respective interference component;
   equalizing the plurality of received data signals to provide a respective plurality of soft symbols that correspond to the transmitted data signal; and
   combining the plurality of soft symbols to reduce the interference component of the data signal and provide an output signal that corresponds to the transmitted data signal, wherein the step of combining comprises:
      combining the plurality of soft symbols based on estimated parameters to provide a combined soft symbol;
      detecting the combined soft symbol to provide a hard value, wherein the hard value is an estimated value of the transmitted data signal based on the combined soft symbol; and
      modifying the estimated parameters based on the combined soft symbol.

2. The method of claim 1, wherein the step of equalizing comprises equalizing the plurality of received data signals to provide a respective plurality of soft symbols that correspond to the transmitted data signal, wherein the soft symbols include data and associated information that indicates a level of confidence in the data.

3. The method of claim 1, wherein one of the received data signals includes at least two interfering portions, wherein the step of equalizing comprises equalizing the at least two interfering portions to reduce multi-path interference.

4. The method of claim 1, wherein the step of equalizing comprises coherently detection by estimating channel coefficients and applying the estimated channel coefficients to the received data signals.

5. The method of claim 1, wherein the step of modifying comprises modifying the estimated parameters based on the hard value.

6. The method of claim 1, wherein the step of detecting comprises detecting the combined soft symbol to provide a hard value, wherein the hard value provides the output signal.

7. The method of claim 1, wherein the step of detecting comprises detecting the combined soft symbol to provide a hard value, wherein the combined soft value provides the output signal.

8. The method of claim 1, wherein the step of receiving the data signal comprises receiving the data signal over a plurality of antennas.

9. The method of claim 1, wherein the transmitted data signal is a predetermined synchronization signal, wherein the predetermined synchronization signal corresponds to a known hard symbol, and wherein the modifying step further comprises modifying the estimated parameters based on the known hard symbol.

10. The method of claim 1, wherein the step of receiving comprises:
   converting the received data signal to baseband digital samples; and wherein the step of equalizing comprises processing the baseband digital samples to provide the soft symbols.

11. A method for reducing an interference component of a data signal corresponding to a transmitted data signal from a remote source, the method comprising:
   receiving the data signal including the interference component over a plurality of paths to provide a plurality of received data signals each including a respective interference component;
   equalizing the plurality of received data signals to provide a respective plurality of soft symbols that correspond to the transmitted data signal; and
   combining the plurality of soft symbols to reduce the interference component of the data signal and provide an output signal that corresponds to the transmitted data signal, wherein the step of combining comprises:
      generating a weighted sum of soft symbols based on the plurality of soft symbols and an error signal;
      detecting the combined soft symbol to provide a hard value, wherein the hard value is an estimated value of the transmitted data signal based on the combined soft symbol; and
      comparing the hard value to the combined soft symbol to provide the error signal that indicates a difference between the combined soft symbol and the hard value.

12. A receiver that reduces an interference component of a data signal corresponding to a transmitted data signal received from a remote source over a plurality of paths, the receiver comprising:
   a plurality of equalizers, each of which is responsive to a respective received data signal received over a respective one of the paths including the interference component, wherein each of the equalizers processes the respective received data signal to provide a respective soft symbol that corresponds to the transmitted data signal; and
   a combiner, responsive to the plurality of equalizers, that combines the plurality of soft symbols to reduce the interference component of the data signal and provide an output signal that corresponds to the transmitted data signal, wherein the combiner combines the plurality of soft symbols based on estimated parameters to provide a combined soft symbol, wherein the combiner detects the combined soft symbol to provide a hard value, wherein the hard value is an estimated value of the transmittal data signal based on the combined soft symbol, and wherein the combiner modifies the estimated parameters based on the plurality of soft symbols.

13. The receiver of claim 12, wherein the soft symbols include data and associated information that indicates a level of confidence in the data.

14. The receiver of claim 12, wherein one of the received data signals includes at least two interfering portions, wherein each of the plurality of equalizers comprises an equalizer that reduces multi-path interference caused by the at least two interfering portions.

15. The receiver of claim 12, wherein the equalizer comprises a coherent detector that estimates channel coefficients and applies the estimated channel coefficients to the received data signal.

16. The receiver of claim 12, wherein the combiner combines the plurality of soft symbols based on estimated parameters to provide a combined soft symbol, wherein the combiner detects the combined soft symbol to provide a hard value, wherein the hard value is an estimated value of the transmitted data signal based on the combined soft symbol, and wherein the combiner generates the estimated parameters based on the hard value.

17. The receiver of claim 12, wherein the hard value is the output signal.

18. The receiver of claim 12, wherein the combined soft symbol is the output signal.

19. The receiver of claim 16, wherein the transmitted data signal is a predetermined synchronization signal, wherein the predetermined synchronization signal corresponds to a known hard symbol, and wherein the combiner modifies the estimated parameters based on the known hard symbol.

20. The receiver of claim 12 further comprising a plurality of antennas wherein each antenna is coupled to a respective equalizer and wherein each antenna receives a respective received data signal for the respective equalizer.

21. The receiver of claim 12, wherein the received data signal is converted to baseband digital samples and wherein the plurality of equalizers processes the baseband digital samples to provide the plurality of soft symbols.

22. The receiver of claim 12 further comprising:
   a plurality on antennas wherein each of the antennas is coupled to a respective one of said equalizers; and
   a plurality of spaced apart radio heads wherein each of the radio heads houses a respective one of the plurality of antennas and the respective equalizer coupled thereto.

23. The receiver of claim 12, further comprising a plurality on antennas wherein each of the antennas is coupled to a respective one of said equalizers, wherein the equalizers are spaced apart.

24. A receiver that reduces an interference component of a data signal corresponding to a transmitted data signal received from a remote source over a plurality of paths, the receiver comprising:
   a plurality of equalizers, each of which is responsive to a respective received data signal received over a respective one of the paths including the interference component, wherein each of the equalizers processes the respective received data signal to provide a respective soft symbol that corresponds to the transmitted data signal; and
   a combiner, responsive to the plurality of equalizers, that combines the plurality of soft symbols to reduce the interference component of the data signal and provide an output signal that corresponds to the transmitted data signal, wherein the combiner comprises:
      an adaptive combiner that generates a weighted sum of soft symbols based on the plurality of soft symbols and an error signal;
      a detector, responsive to the adaptive combiner, that detects the combined soft symbol to provide a hard value, wherein the hard value is an estimated value of the transmitted data signal based on the combined soft symbol; and
      a comparator, responsive to the detector, that compares the hard value to the combined soft symbol to provide the error signal that indicates the difference between the combined soft symbol and the hard value.

25. A receiver that reduces an interference component of a data signal corresponding to a transmitted data signal received from a remote source over a plurality of paths, the receiver comprising:
   a plurality of equalizers, each of which is responsive to a respective received data signal received over a respective one of the paths including the interference component, wherein each of the equalizers processes the respective received data signal to provide a respective soft symbol that corresponds to the transmitted data signal;
   a combiner, responsive to the plurality of equalizers, that combines the plurality of soft symbols to reduce the interference component of the data signal and provide an output signal that corresponds to the transmitted data signal;
   a housing wherein the plurality of equalizers and the combiner are located within the housing;
   an antenna attached to the housing wherein the antenna is coupled to a first one of the equalizers; and
   a port on the housing and coupled to a second one of the equalizers wherein the port provides a detachable coupling between an external antenna and the second equalizer.

26. A receiver that reduces an interference component of a data signal corresponding to a transmitted data signal from a remote source, the receiver comprising:
   means for receiving the data signal including the interference component over a plurality of paths to provide a plurality of received data signals each including a respective interference component;
   means for equalizing the plurality of received data signals to provide a respective plurality of soft symbols that correspond to the transmitted data signal; and
   means for combining the plurality of soft symbols to reduce the interference component of the data signal and provide an output signal that corresponds to the transmitted data signal, wherein the means for combining comprises:
      means for combining the plurality of soft symbols based on estimated parameters to provide a combined soft symbol;
      means for detecting the combined soft symbol to provide a hard value, wherein the hard value is an estimated value of the transmitted data signal based on the combined soft symbol; and
      means for modifying the estimated parameters based on the combined soft symbol.

27. The receiver of claim 26, wherein the means for equalizing comprises means for equalizing the plurality of received data signals to provide a respective plurality of soft symbols that correspond to the transmitted data signal, wherein the soft symbols include data and associated information that indicates a level of confidence in the data.

28. The receiver of claim 26, wherein one of the received data signals includes at least two interfering portions, wherein the equalizing means comprises means for equalizing the at least two interfering portions to reduce intersymbol interference.

29. The receiver of claim 26, wherein the means for equalizing comprises means for coherently detecting the transmitted signal by estimating channel coefficients and means for applying the estimated channel coefficients to the received data signals.

30. The receiver of claim 26, wherein the means for modifying comprises means for modifying the estimated parameters based on the hard value.

31. The receiver of claim 26, wherein the means for detecting comprises means for detecting the combined soft symbol to provide a hard value, wherein the hard value provides the output signal.

32. The receiver of claim 26, wherein the means for detecting comprises means for detecting the combined soft symbol to provide a hard value, wherein the combined soft value provides the output signal.

33. The receiver of claim 26, wherein the means for receiving the data signal comprises means for receiving the data signal over a plurality of antennas.

34. The receiver of claim 30, wherein the data signal is a predetermined synchronization signal, wherein the predetermined synchronization signal corresponds to a known combined soft symbol, and wherein the means for modifying further comprises modifying the estimated parameters based on the known combined soft symbols.

35. The receiver of claim 26, wherein the means for receiving comprises:

means for converting the received data signal to baseband digital samples, and wherein the means for equalizing comprises means for processing the baseband digital samples to provide the plurality of soft symbols.

36. A mobile receiver that reduces an interference component of a data signal corresponding to a transmitted data signal from a remote source, the mobile receiver comprising:

an antenna that receives the data signal including the interference component to provide a first received data signal that includes a respective interference component;

a first equalizer, responsive to the antenna, that processes the received data signal to provide a respective soft symbol that corresponds to the transmitted data signal;

a port that provides a detachable coupling to an external accessory wherein the port receives an accessory soft symbol from the accessory; and a combiner, responsive to the first equalizer and the port, that combines the respective soft symbol and the accessory soft symbol that corresponds to the transmitted data signal to reduce the interference component of the data signal and provide an output signal that corresponds to the transmitted data signal.

37. The mobile receiver of claim 36, wherein the soft symbol includes data and associated information that indicates a level of confidence in the data.

38. The mobile receiver of claim 36, wherein the combiner comprises:

a soft symbol combiner that combines the plurality of soft symbols based on estimated parameters to provide a combined soft symbol;

a detector, responsive to the adaptive soft symbol combiner, that detects the combined soft symbol to provide a hard value, wherein the hard value is an estimated value of the transmitted data signal based on the combined soft symbol; and a parameter generator, responsive to the detector, that modifies the estimated parameters based on the plurality of soft symbols.

39. The mobile receiver of claim 36, wherein the combiner comprises:

an adaptive combiner that generates a sum of weighted soft symbols based on the plurality of soft symbols and an error signal;

a detector, responsive to the adaptive combiner, that detects the combined soft symbol to provide a hard value, wherein the hard value is an estimated value of the transmitted data signal based on the combined soft symbol; and a comparator, responsive to the detector, that compares the hard value to the combined soft symbol to provide the error signal that indicates the difference between the combined soft symbol and the hard value.

40. An accessory for a mobile user terminal wherein the mobile user terminal includes a mobile user terminal antenna that receives a first received data signal corresponding to a transmitted data signal from a remote source including an interference component, a mobile user terminal equalizer coupled to the mobile user terminal antenna that processes the received data signal to provide a first soft symbol, a port, and a combiner coupled to the mobile user terminal equalizer and the port to receive a second soft symbol from the accessory wherein the combiner combines the first and second soft symbols to reduce the interference component of the data signal, the accessory comprising:

an accessory antenna separate from the mobile user terminal that receives a second received data signal corresponding to the transmitted data signal from the remote source including the interference component;

an accessory equalizer separate from the mobile user terminal responsive to the accessory antenna that processes the second received data signal to provide an accessory soft symbol; and a detachable accessory connector that provides the accessory soft symbol to the port.

41. A mobile receiver that reduces an interference component of a data signal corresponding to a transmitted data signal from a remote source, the mobile receiver comprising:

an antenna that receives the data signal including the interference component to provide a first received data signal that includes a respective interference component;

a first equalizer, responsive to the antenna, that processes the received data signal to provide a respective soft symbol that corresponds to the transmitted data signal;

a port that provides a detachable coupling to an external accessory antenna wherein the port receives an external accessory received data signal from the external accessory antenna;

a second equalizer, that processes the external accessory received data signal to provide a respective soft symbol that corresponds to the transmitted data signal; and a combiner, responsive to the first equalizer, that combines the respective soft symbol and the accessory soft symbol that corresponds to the transmitted data signal to reduce the interference component of the data signal and provide an output signal that corresponds to the transmitted data signal.

42. A radiotelephone that reduces an interference component of a data signal corresponding to a transmitted data signal received from a remote source over a plurality of paths, the radiotelephone comprising:

a plurality of equalizers, each of which is responsive to a respective received data signal received over a respective one of the paths including the interference component, wherein each of the equalizers processes the respective received data signal to provide a respective soft symbol that corresponds to the transmitted data signal; and a combiner, responsive to the plurality of equalizers, that combines the plurality of soft symbols based on correlation of respective interference components to reduce the interference component of the data signal and provide an output signal that corresponds to the transmitted data signal, wherein the combiner combines the plurality of soft symbols based on estimated parameters to provide a combined soft symbol, wherein the combiner detects the combined soft symbol to provide a hard value, wherein the hard value is an estimated value of the transmittal data signal based on the combined soft symbol, and wherein the combiner modifies the estimated parameters based on the hard value.

43. The radiotelephone of claim 42, wherein the soft symbols include data and associated information that indicates a level of confidence in the data.

44. The radiotelephone of claim 42, wherein one of the received data signals includes at least two interfering portions, wherein each of the plurality of equalizers comprises an equalizer that reduces multi-path interference caused by the at least two interfering portions.

45. The radiotelephone of claim 42, wherein the equalizer comprises a coherent detector that estimates channel coefficients and applies the estimated channel coefficients to the received data signal.

46. The radiotelephone of claim 42, wherein the combiner combines the plurality of soft symbols based on estimated parameters to provide a combined soft symbol, wherein the combiner detects the combined soft symbol to provide a hard value, wherein the hard value is an estimated value of the transmitted data signal based on the combined soft symbol, and wherein the combiner generates the estimated parameters based on the hard value.

47. The radiotelephone of claim 42, wherein the hard value is the output signal.

48. The radiotelephone of claim 42, wherein the combined soft symbol is the output signal.

49. A radiotelephone that reduces an interference component of a data signal corresponding to a transmitted data signal received from a remote source over a plurality of paths, the radiotelephone comprising:
   a plurality of equalizers, each of which is responsive to a respective received data signal received over a respective one of the paths including the interference component, wherein each of the equalizers processes the respective received data signal to provide a respective soft symbol that corresponds to the transmitted data signal; and
   a combiner, responsive to the plurality of equalizers, that combines the plurality of soft symbols based on correlation of respective interference components to reduce the interference component of the data signal and provide an output signal that corresponds to the transmitted data signal, wherein the combiner comprises:
      an adaptive combiner that generates a weighted sum of soft symbols based on the plurality of soft symbols and an error signal;
      a detector, responsive to the adaptive combiner, that detects the combined soft symbol to provide a hard value, wherein the hard value is an estimated value of the transmitted data signal based on the combined soft symbol; and
      a comparator, responsive to the detector, that compares the hard value to the combined soft symbol to provide the error signal that indicates the difference between the combined soft symbol and the hard value.

50. A method for reducing an interference component of a data signal corresponding to a transmitted data signal from a remote source, the method comprising:
   receiving the data signal including the interference component over a plurality of paths to provide a plurality of received data signals each including a respective interference component;
   equalizing the plurality of received data signals to provide a respective plurality of soft symbols that correspond to the transmitted data signal; and
   combining the plurality of soft symbols to reduce the interference component of the data signal and provide an output signal that corresponds to the transmitted data signal, wherein the step of combining comprises:
      combining the plurality of soft symbols based on estimated parameters to provide a combined soft symbol;
      detecting the combined soft symbol to provide a hard value, wherein the hard value is an estimated value of the transmitted data signal based on the combined soft symbol; and
      modifying the estimated parameters based on the hard value.

* * * * *

UNITED STATES PATENT AND TRADEMARK OFFICE
CERTIFICATE OF CORRECTION

PATENT NO. : 6,574,293 B1
DATED : June 3, 2003
INVENTOR(S) : Khayrallah et al.

It is certified that error appears in the above-identified patent and that said Letters Patent is hereby corrected as shown below:

<u>Column 1,</u>
Line 1, please insert the following:

FIELD OF THE INVENTION

The present invention relates to the field of communications in general and to interference reduction in particular.

BACKGROUND OF THE INVENTION

Radio communications systems, such as cellular communications systems, are commonly employed to provide voice and data communications to a plurality of receivers or subscribers. Analog cellular systems, such as AMPS, ETACS, NMT-450, and NMT-900, have been deployed successfully throughout the world. More recently, digital cellular systems such as IS-54B and IS-136 in North America and the pan-European GSM system have been introduced. These systems, and others, are described, for example, in the book titled *Cellular Radio Systems* by Balston, et al., published by Artech House, Norwood, MA., 1993.

Frequency reuse is commonly employed in cellular technology wherein groups of frequencies are allocated for use in regions of limited geographic coverage known as cells. Cells containing equivalent groups of frequencies are geographically separated to allow receivers in different cells to simultaneously use the same frequency without interfering with each other. By so doing many thousands of subscribers may be served by a system of only several hundred frequencies.

In a radio communications system, transmitted data signals may be affected by interference from other signals or echoes and reflections of the transmitted data signal. The interference may be reduced by custom-designed interference rejection/combining (IRC) circuits. The above-referenced techniques, however, may increase the system design cost.

Signed and Sealed this

Second Day of December, 2003

JAMES E. ROGAN
*Director of the United States Patent and Trademark Office*